United States Patent
Smith et al.

(10) Patent No.: US 8,806,994 B2
(45) Date of Patent: Aug. 19, 2014

(54) HANDBRAKE TOOL FOR RAILROAD CAR

(76) Inventors: Jason J. Smith, Beaumont, CA (US);
Darryl J. Smith, Yucaipa, CA (US);
Matthew W. Smith, Yucaipa, CA (US)

(*) Notice: Subject to any disclaimer, the term of this patent is extended or adjusted under 35 U.S.C. 154(b) by 356 days.

(21) Appl. No.: 13/312,901

(22) Filed: Dec. 6, 2011

(65) Prior Publication Data

US 2012/0073411 A1 Mar. 29, 2012

(51) Int. Cl.
| B25G 1/01 | (2006.01) |
| B25B 13/00 | (2006.01) |
| B25B 23/16 | (2006.01) |
| B25B 13/48 | (2006.01) |
| B25B 13/50 | (2006.01) |
| B60T 7/10 | (2006.01) |
| B60T 17/22 | (2006.01) |
| B61H 13/02 | (2006.01) |

(52) U.S. Cl.
CPC .............. *B25B 13/48* (2013.01); *B25B 13/50* (2013.01); *B60T 7/10* (2013.01); *B60T 17/221* (2013.01); *B61H 13/02* (2013.01)
USPC ........................... 81/489; 81/124.2; 81/177.2

(58) Field of Classification Search
CPC ......... B25B 13/48; B25B 33/00; B61H 13/02
USPC ...................... 81/177.2, 120, 124.2
See application file for complete search history.

(56) References Cited

U.S. PATENT DOCUMENTS

| 2,000,744 | A | * | 5/1935 | Davies | 81/111 |
| 2,357,562 | A | * | 9/1944 | Thom et al. | 81/176.2 |
| D422,193 | S | * | 4/2000 | Walker | D8/107 |
| 7,637,183 | B2 | * | 12/2009 | Alvarado | 81/120 |
| 7,878,094 | B2 | * | 2/2011 | Lin | 81/177.2 |
| 2010/0307296 | A1 | * | 12/2010 | Jones | 81/60 |
| 2012/0204684 | A1 | * | 8/2012 | Monroe | 81/177.1 |

* cited by examiner

*Primary Examiner* — Bryan R Muller
(74) *Attorney, Agent, or Firm* — Polomar Patent; Calif Tervo

(57) ABSTRACT

A tool for manipulating the hand brake controls on a railroad car by a user standing on the ground generally comprises an elongate handle and a split collar swively attached to the distal end of the handle. The collar includes split for passage of the rim of a brake wheel, and a central bore for retaining the rim while the user turns the brake wheel with the collar bearing against a spoke. A cavity in distal end of handle is adapted for engaging the free end of a brake release handle for moving it to release the brakes. Each side of the collar includes a concave portion adapted for engaging a spoke of the brake wheel for turning the wheel for final tightening of the brakes. Preferably, the handle includes a plurality of telescopingly coupled sections and locks for locking the handle at an extended position.

5 Claims, 2 Drawing Sheets

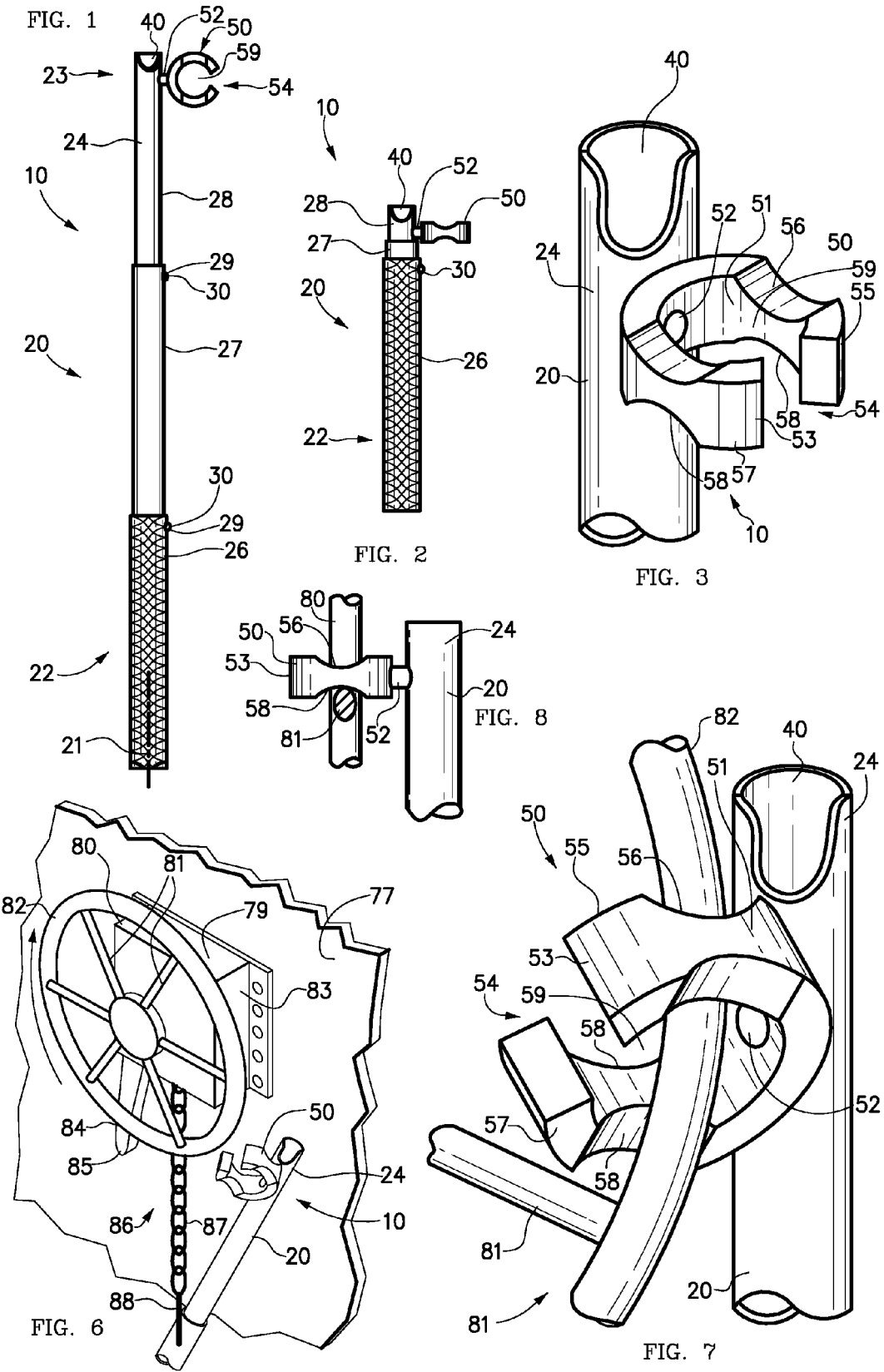

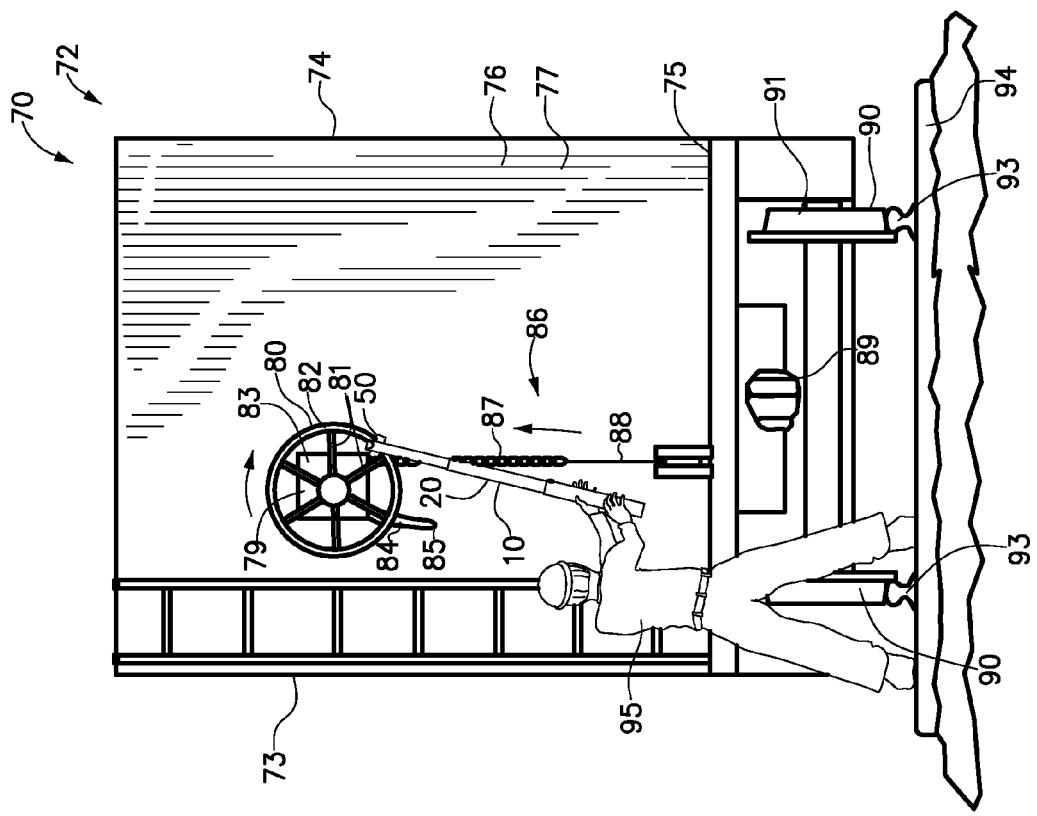
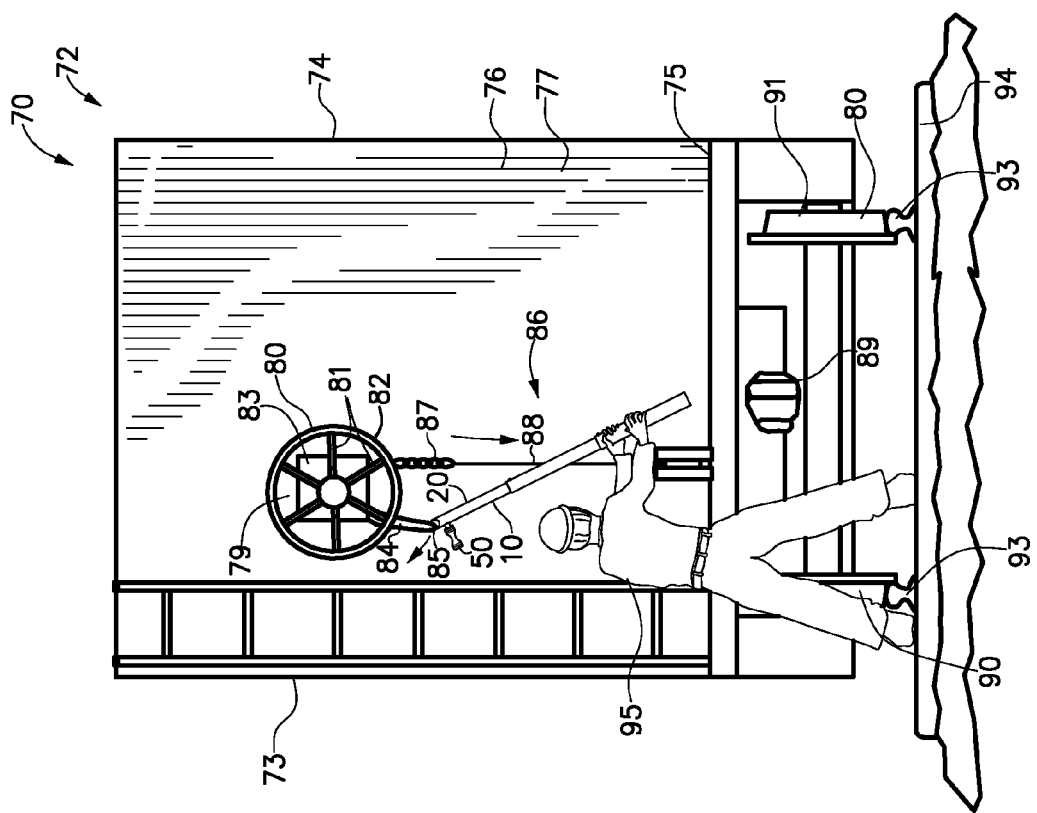

HANDBRAKE TOOL FOR RAILROAD CAR

FIELD OF THE INVENTION

This invention relates to a tool for manipulating the hand brake controls on a railroad car and more specifically to a tool that is attached to the rim of the brake wheel for rapidly turning the brake wheel.

BACKGROUND OF THE INVENTION

A parked railroad car uses a hand brake to hold it in position. Manipulating the hand brake generally requires a brakeman to climb onto a car, turn the brake wheel multiple turns, maybe as many as twenty, and descend from the car. It is not uncommon for a brakeman to have to set or release forty or fifty hand brakes at a time. Thus, a brakeman may find it necessary to make over one thousand turns of brake wheels for one parking. Many injuries to brakemen result from mounting and dismounting the cars.

Several devices have been introduced to allow the brakeman to manipulate the brake controls from the ground, such as U.S. Pat. No. 5,481,950, U.S. Pat. No. 6,182,539 B1, and US 2010/0109357. However these devices interact solely with the spokes of a brake wheel and do not provide a good means for rapidly turning the wheel the many times necessary to set the brake.

Therefore there has been a need for an improved tool for releasing and setting railroad car hand brakes that provides for rapid turning of the wheel and firm setting of the brake.

It is further desirable that the tool include elements for firmly manipulating the brake release lever.

SUMMARY OF THE INVENTION

The invention is a tool for manipulating the hand brake controls on a railroad car by a user standing on the ground. The tool generally comprises an elongate handle and a split collar. The handle has a proximal end for gripping by a user and a distal end. The split collar includes a proximal side swivelly attached to the handle near the distal end such that the collar extends laterally therefrom, a distal side including a split for passage of the rim of a brake wheel, and a central bore for retaining the rim while the user turns the wheel with the collar bearing against a spoke, a first side, and a second side.

Preferably, the distal end of the handle includes a cavity adapted for engaging the free end of the brake release handle for moving the release handle to release the brakes. Preferably, each side of the collar includes a concave portion adapted for engaging a spoke of the wheel for turning the wheel for final tightening of the wheel. Preferably, the handle includes a plurality of telescopingly coupled sections and locking means for locking the handle at an extended position.

Other features and many attendant advantages of the invention will become more apparent upon a reading of the following detailed description together with the drawings wherein like reference numerals refer to like parts throughout.

BRIEF DESCRIPTION OF THE DRAWINGS

FIG. 1 is a front elevation view of an exemplary embodiment of the railroad car handbrake tool of the invention.

FIG. 2 is a front elevation view of the tool of FIG. 1 in a telescopingly retracted position.

FIG. 3 is a partial, enlarged view of the upper end of the tool of FIG. 1.

FIG. 4 is an end elevation view of a railroad car showing a user using the tool to release the brake lever.

FIG. 5 is an end elevation view of a railroad car showing a user using the tool to set the brake.

FIG. 6 is an enlarged perspective view of the brake control assembly of FIG. 5 further showing the tool in position for attachment.

FIG. 7 is a perspective view showing the tool being attached to the brake wheel from the side.

FIG. 8 is a partial side sectional view of the tool tightening the brake wheel.

DETAILED DESCRIPTION OF THE INVENTION

First, with reference to FIGS. 4, 5 and 6, there is shown the railroad car handbrake tool 10 of the invention in common use. FIG. 4 is an end elevation view of a railroad car 70 showing a user 95 using tool 10 to release the brake release handle 84. FIG. 5 is an end elevation view of a railroad car 70 showing a user using tool 10 to turn brake wheel 80 to set the brakes 91. FIG. 6 is an enlarged perspective view of the brake control assembly 79 of FIG. 5 further showing tool 10 in position for attachment to rim 82 of brake wheel 80.

Railroad car 70 includes a container 72 having a left side 73, right side 74, bottom 75 and end 76 including an end wall 77 and a coupler 89 for connecting to another railroad car. A plurality of wheels 90 rollingly support container 72 on a rail system including spaced rails 93 on ties 94. Each wheel 90 has an associated brake 91 for preventing rotation of wheel 90.

The railroad car handbrake control assembly 79 includes a brake wheel 80, a drum unit 83, and linkage 86. Wheel 80 includes spokes 81 supporting a rim 82. Common linkage 86 includes an upper chain 87 and a lower cable 88 connected to brakes 91. Drum unit 83 is mounted to end wall 77 of railroad car 70 and includes a ratcheting cogged drum that engages chain 87 for wrapping up chain 87 to set brakes 91 and a brake release handle 84 for releasing the drum and releasing brakes 91. Brake wheel 80 is rotatably coupled to the drum such that it can be rotated to take up chain 87 to set brakes 91.

Tool 10 is of sufficient length such that user 95 may stand on the ground, such as with a leg on either side of rail 93 and access the top of brake wheel 80 for rotating wheel 80.

Further including FIGS. 1-2, there is shown in FIG. 1 a front elevation view of an exemplary embodiment of the railroad car handbrake tool 10 of the invention in an extended position, and in FIG. 2 a front elevation view of tool 10 of FIG. 1 in a telescopingly retracted position.

Tool 10 generally comprises an elongate handle 20 having a longitudinal axis 21, an end cavity 40, and a split collar 50. Handle 20 is of sufficient length for user 95 on the ground to spin brake wheel 80 as will be described. A length of about 36" has proven effective. Preferably handle 20 is adjustable in length so that it is more easily carried by user 95. In the exemplary embodiment, handle 20 is constructed with a grip section 26 on the proximal end 22, a midsection 27 and a top section 28 with midsection 27 telescopically received within grip section 26 and top section 28 telescopically received within midsection 27. Locking means 29, such as biased push buttons 30 as are well-known in that art, lock the sections 26, 27, 28 in the extended position for manipulating brake wheel 80. Any of many other types of locking means 29 could be used, such as those used on poles of similar use (U.S. Pub. No. 2010/0109357 and U.S. Pat. No. 6,182,539 B1) or of the camming type used on trekking poles or as on walking canes or sticks (U.S. Pat. No. 3,987,807 and U.S. Pat. No. 6,938,927). Grip section 26 is preferably textured or covered with a grip, such as of rubber, to provide a firm surface for gripping by user 95. Preferably, handle 20 is retained in the retracted position of FIG. 2 by friction or gravity. Alternatively, other common retaining means could be used.

With reference to FIGS. 3 and 4, there is shown use of tool 10 to release the railroad car brake 91. FIG. 3 is a partial, enlarged view of the upper or distal end 24 of handle 20 including a cavity 40 for engaging the lower end 85 of brake release handle 84. As seen in FIG. 4, cavity 40 is engaged with the lower end 85 of brake release handle 84 so as to move handle end 85 to the left to release the brakes 91.

FIGS. 3 and 5-8 best show split collar 50 and its functions. FIG. 3 is a partial, enlarged perspective view of upper end 24 of tool 10 of FIG. 1 showing collar 50. FIG. 5 shows collar 50 attached to brake wheel 80 for turning brake wheel 80. FIG. 6 is an enlarged perspective view of the brake control assembly 79 of FIG. 5 showing collar 50 in position for attachment to rim 82 of brake wheel 80. FIG. 7 is an enlarged perspective view showing collar 50 in mid-attachment to rim 82. FIG. 8 is a partial side sectional view of collar 50 performing a final tightening of brake wheel 80 by using a concave portion 56 or 58 of collar 50 to pull on spoke 81.

Split collar 50 is preferably C-shaped and includes a proximal side 51 swivelly attached to handle 20 near distal end 24 with swivel 52 such that collar 50 extends laterally from handle 20, a distal side 53 including a passageway or split 54 for entry or passage of rim 82 or spoke 81 of brake wheel 80, a central bore 59 for retaining the rim 82 or spoke 81 received from split 54 while user 95 turns wheel 80 with tool 10, a first side 55 and a second side 57. First side 55 includes a concave portion 56. Second side 57 includes a concave portion 58.

FIG. 6 shows collar 50 in position for attachment to rim 82 of brake wheel 80. Collar 50 approaches rim 82 from a side such that rim 82 passes thought split 54 into bore 59 as seen in FIG. 7. Handle 20 is then rotated to be in front of wheel 80 as shown in FIG. 5 and attempt is made to rotate wheel 80. Collar 50 slides on rim 82 to a spoke 81 and then wheel 80 is turned by collar 50 bearing against spoke 81. Alternatively, collar 50 can be attached to a spoke 81 and can turn brake wheel 80 multiple turns while attached to spoke 81. Wheel 80 is turned multiple turns without disengaging collar 50.

When turning becomes difficult, collar 50 is disengaged from rim 82. If it is felt that further tightening may be desirable, then, as illustrated in FIG. 8, a concave portion 56, 58 of collar 50 may be engaged with a spoke 81 and handle 20 pulled for final tightening.

An additional fail-safe feature of brake tool 10 is that once collar 50 is attached to brake wheel 80, such as to rim 82 or spoke 81, it will remain attached until disengaged by user 95 by re-rotation of handle 20. Therefore, if user 95 needs to quickly get clear of cars 70 in an emergency, user 95 can simply release hold of handle 20 of brake tool 10 and tool 10 remains fastened such that it will not fall and possibly cause injury.

From the foregoing description, it is seen that the present invention provides an extremely simple, efficient, and reliable tool for controlling railroad car hand brakes.

Having described the preferred embodiments of the present invention, many alterations and modifications which are within the inventive concepts disclosed herein will likely occur to those skilled in the art. For example, although a C-shaped collar 50 is shown as most desirable for remaining engaged with rim 82 while turning wheel 80, other configurations, such as U-shaped, could be used. Although a three section handle 20 is shown, any desirable number of sections could be used.

Thus, although a particular embodiment of the invention has been illustrated and described; various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

We claim:

1. A tool for manipulating the hand brake controls on a railroad car, the brake controls including a brake wheel having a front and a rear and including radial spokes supporting a rim, the wheel being freely rotatable about a rear wheel axis; said tool comprising:
   an elongate handle having a longitudinal axis including:
      a proximal end for gripping by a user; and
      a distal end; and
   a C-shaped collar for pivotally coupling said distal end of said handle to a spoke or the rim of the wheel such that a reciprocal motion of said proximal end of said handle may fully rotate the wheel; said collar including:
      a proximal side pivotally attached to said handle near a distal end by an axle extending from a lateral side of the handle such that said collar is freely rotatable by 360 degrees about a pivot axis passing through said handle substantially perpendicular to the longitudinal axis of the handle, wherein said collar remains on the lateral side of the handle during rotation of said collar about said pivot axis;
      a split for passage of the rim or a spoke of the brake wheel; and
      a central bore for retaining the rim or a spoke received by said split while a user turns the brake wheel with said tool.

2. The tool of claim 1 wherein:
   said handle includes:
      a plurality of telescopingly coupled sections.

3. The tool of claim 2 wherein:
   said handle includes locking means for locking said handle at an extended position.

4. A tool for manipulating the hand brake controls on a railroad car, the brake controls including: a brake wheel having a front and a rear and including radial spokes supporting a rim, the wheel being freely rotatable about a rear wheel axis; and a brake release handle having an elongate shaft and a rounded free end; said tool comprising:
   an elongate handle having a longitudinal axis including:
      plurality of telescopingly coupled sections including:
         locking means for locking said handle at an extended position;
         a proximal end for gripping by a user; and
         a distal end including:
            a cavity adapted for receiving the rounded free end of the brake release handle for moving the release handle without slippage along the shaft; and
   a C-shaped collar for pivotally coupling said distal end of said handle to a spoke or the rim of the wheel such that a reciprocal motion of said proximal end of said handle may fully rotate the wheel; said collar including:
      a proximal side pivotally attached to said handle near a distal end by an axle extending from a lateral side of the handle such that said collar is freely rotatable by 360 degrees about a pivot axis passing through said handle substantially perpendicular to the longitudinal axis of the handle, wherein said collar remains on the lateral side of the handle during rotation of said collar about said pivot axis;
a split for passage of the rim or a spoke of the brake wheel; and
a central bore for retaining the rim or a spoke received by said split while a user turns the brake wheel with said tool.

5. A method of fully rotating the brake wheel of a railroad car; the brake wheel having a front and a rear and including radial spokes supporting a rim, the wheel being freely rotatable about a rear wheel axis; said method comprising the step of:

providing a tool comprising: an elongate handle having a longitudinal axis including: a proximal end for gripping by a user; and a distal end; and a C-shaped collar including: a proximal side pivotally attached to said handle near a distal end by an axle extending from a lateral side of the handle such that the collar is freely rotatable by 360 degrees about a pivot axis passing through said handle substantially perpendicular to the longitudinal axis of the handle, wherein said collar remains on the lateral side of the handle during rotation of said collar about said pivot axis; a split for passage of the rim or a spoke of the brake wheel; and a central bore for retaining the received rim or spoke by the split while a user turns the brake wheel with the tool;

connecting the distal end of the handle to the wheel by passing a spoke or the rim of the wheel through the split in the collar and into the central bore;

positioning the connected distal end in front of the wheel such that the pivot axis parallels the wheel axis;

reciprocating the proximal end of the handle so as to fully rotate the wheel.

* * * * *